(12) United States Patent
Jordan

(10) Patent No.: US 6,478,641 B2
(45) Date of Patent: Nov. 12, 2002

(54) TRANSMISSION FOR DRIVING COUNTER-ROTATING PROPELLERS, LUBRICATION SYSTEM, AND ASSOCIATED METHODS

(76) Inventor: W. Bishop Jordan, 245 Quayside Cir., Maitland, FL (US) 32751

(*) Notice: Subject to any disclaimer, the term of this patent is extended or adjusted under 35 U.S.C. 154(b) by 0 days.

(21) Appl. No.: 09/766,878

(22) Filed: Jan. 19, 2001

(65) Prior Publication Data

US 2002/0086595 A1 Jul. 4, 2002

Related U.S. Application Data

(60) Provisional application No. 60/177,051, filed on Jan. 20, 2000.

(51) Int. Cl.[7] .............................................. B63H 20/14
(52) U.S. Cl. .......................................... 440/75; 440/81
(58) Field of Search .............................. 440/49, 55, 75, 440/80, 81, 83

(56) References Cited

U.S. PATENT DOCUMENTS

| | | |
|---|---|---|
| 1,329,387 A | 2/1920 | Fay |
| 1,734,268 A | 11/1929 | Moorhouse |
| 1,842,055 A | 1/1932 | Stout |
| 2,244,763 A | 6/1941 | Bugatti |
| 2,380,952 A | 8/1945 | Dewey |
| 2,525,708 A | 10/1950 | Morris |
| 2,531,032 A | 11/1950 | Desmoulins |
| 2,584,115 A | 2/1952 | Dinsmoor |
| 3,500,784 A | 3/1970 | Reynolds |
| 3,991,629 A | 11/1976 | Dearnley |
| 4,127,080 A | 11/1978 | Lakiza et al. |
| 4,392,839 A | 7/1983 | Aucktor |
| 4,421,489 A | 12/1983 | Van Veldhuizen |
| 4,426,049 A | 1/1984 | Stewart |
| 4,527,978 A | 7/1985 | Zackrisson |
| 4,820,241 A | 4/1989 | Nakamura |
| 4,826,458 A | 5/1989 | Irwin et al. |
| 4,861,294 A * | 8/1989 | Ousley, II ................ 440/83 |
| 4,887,983 A * | 12/1989 | Bankstahl et al. ........ 440/75 |
| 4,932,280 A | 6/1990 | Becker et al. |
| 4,932,907 A * | 6/1990 | Newman et al. ........ 440/75 |
| 5,090,869 A | 2/1992 | Wright |
| 5,374,208 A * | 12/1994 | Von Bergen et al. .... 440/80 |
| 5,724,867 A | 3/1998 | Jordan |
| 5,807,149 A | 9/1998 | Kaye |
| 6,053,782 A | 4/2000 | Jordan |
| 6,299,495 B1 * | 10/2001 | Jordan ..................... 440/75 |

FOREIGN PATENT DOCUMENTS

DE  62131  5/1892

* cited by examiner

Primary Examiner—Stephen Avila
(74) Attorney, Agent, or Firm—Allen, Dyer, Doppelt, Milbrath & Gilchrist, P.A.

(57) ABSTRACT

A hybrid gear/sprocket-based transmission is provided for driving a pair of coaxial, counter-rotating propellers in aircraft and airboats. A drive shaft couplable to an engine crank shaft extends rearward into the transmission case, and a pair of coaxial hollow driven shafts extend rearward out of the transmission case, to which are attachable a pair of propellers. A gear train, containing an even number of gears, reverses the rotational direction of the engine; a sprocket train, containing two sprockets and a chain connecting them, retains the rotational direction of the engine. Improved stability characteristics are imparted by supporting the drive shaft at two points within the case and also by positioning the drive and the driven shafts in vertical alignment. The adaptability of the transmission to being coupled with an automobile engine confers improved noise, reliability, and fuel efficiency characteristics.

22 Claims, 2 Drawing Sheets

TRANSMISSION FOR DRIVING COUNTER-ROTATING PROPELLERS, LUBRICATION SYSTEM, AND ASSOCIATED METHODS

CROSS-REFERENCE TO RELATED APPLICATION

This application claims priority from provisional application No. 60/177,051, "Transmission for Driving Counter-Rotating Propellers, Lubrication System, and Associated Methods," filed Jan. 20, 2000.

BACKGROUND OF THE INVENTION

1. Field of the Invention

The present invention relates to propulsion mechanisms for vessels driven by propellers, and, more particularly, to transmissions for aircraft and airboats, and to lubrication systems therefor.

2. Description of Related Art

Transmissions for driving a pair of counter-rotating propellers are known in the art for both airplanes and airboats. Such transmissions are known to be driven by belts and by gears, with input typically provided by a shaft driven by an aircraft engine operating at approximately 2500–3000 revolutions per minute (rpm). Aircraft engines are extremely expensive, noisy, and fuel inefficient.

Airboat systems that utilize belt-driven transmissions are inefficient owing to power losses caused by belt friction, especially at higher rotational velocities. Belt breakage in these systems is a source of failure. Another disadvantage of belt-driven systems is their inability to permit reduction of engine speed, since the shaft used to effect such a reduction would have to be too small to be practicable. Thus it has been deemed advantageous to utilize a different transmission method in an airboat to enable engine speed reduction without loss of efficiency.

A belt-driven, two-engine counter-rotating system has been disclosed by Stewart (U.S. Pat. No. 4,426,049). It has been taught by Becker et al. (U.S. Pat. No. 4,932,280) to use coaxial drive shaft systems for driving multiple outputs from a single input in an aircraft. Gearing means are disclosed for driving two outputs at different speeds.

A double-sprocket and wheel transmission for driving multiple propellers in the same direction is described by Fay (U.S. Pat. No. 1,329,387).

The use of a gear-based transmission for airboats has been taught by Kaye (U.S. Pat. No. 5,807,149), including a transmission for driving a pair of counter-rotating coaxial shafts, to each of which is affixed a propeller. Such an arrangement can be used with an automobile engine, which is far more economical than an aircraft engine. This transmission has been shown to reduce noise and torque, to permit varying gear ratios, to increase fuel efficiency and engine life, and to be less expensive to operate.

Improved gear-based transmissions for airboats have also been disclosed by Jordan (U.S. Pat. Nos. 5,724,867 and 6,xxx,xxx, the entire contents of both of which are incorporated herein by reference). In the 'xxx patent a lubrication system is also taught that includes a gear for driving lubricant from a well to the interior of the inner output shaft, out of that space to a pair of stiffener bearings, and into the space between the output shafts.

Another source of failure in transmissions is failure of the oil pump that heretofore has been considered an essential element.

SUMMARY OF THE INVENTION

It is an object of the present invention to provide a transmission that has improved strength and stability characteristics for driving a pair of counter-rotating propellers.

It is a further object to provide such a transmission having a single input shaft for driving means for driving the two output driven shafts.

It is another object to provide a transmission for driving coaxial counter-rotating propellers that is drivable at variable or equal speeds as desired.

It is an additional object to provide such a transmission with which it is possible to drive the counter-rotating propellers at different speeds to provide additional thrust, reduce noise output, and improve fuel efficiency.

It is also an object to provide such a transmission that is considerably lighter than previously known devices.

A further object is to provide a system and method for lubricating the output driven shafts that reduces weight and complexity.

Another object is to provide a system and method for achieving a simplified lubrication of a transmission and propulsion for an airboat.

An additional object is to provide such a system and method that eliminates the need for an oil pump to circulate lubricant.

These and other objects are achieved by the transmission of the present invention, which is for driving a pair of coaxial, counter-rotating propellers for, for example, an airboat or an aircraft, although these are not intended as limiting usages. The transmission is housed in a case that has an interior space.

A drive shaft extends from the outside of the case into the interior space and is rotatable in a first direction. When the transmission is in use on an aircraft or airboat, the drive shaft is mated at one end to a motor crank extending from and rotated by an engine. As mentioned above, previously known aircraft and airboats have utilized aircraft-type engines; however, with the transmission of the present invention, it has been found that an automobile engine can be used. This has a benefit of reducing cost, as well as other benefits to be discussed below.

A first driven shaft also extends into the interior space of the case, typically from a side opposite that of the drive shaft. The first driven shaft is for rotating an outer propeller, that is, the propeller farther from the airboat body.

A second driven shaft, which is hollow, likewise extends into the interior space of the case and is further positioned in surrounding, generally coaxial arrangement to the first driven shaft. The second driven shaft is shorter than the first, and both ends protrude beyond the ends of the first driven shaft. This second driven shaft is for rotating an inner propeller, that is, the propeller closer to the airboat body.

A gear train for driving the first shaft is housed in the interior space of the case. In its simplest configuration, the gear train comprises two gears: a drive gear and a driven gear. The drive gear is coaxially affixed to the drive shaft. The driven gear is coaxially affixed to the first shaft in such a position and configured so as to be rotatable by the drive gear. Thus, when the drive shaft rotates in the first direction, the drive gear is rotated in the first direction. This causes the first driven gear to be rotated in a second direction opposite in sense to the first direction, which consequently drives the first shaft in the second direction.

In an alternate embodiment, additional intermediate driven gears may be interposed between the drive gear and the first driven gear, so long as the total number of intermediate gears is an even number.

A sprocket train is also housed in the interior space of the case. This sprocket train includes a first and a second sprocket and a chain. The first sprocket is coaxially affixed to the drive shaft. The second sprocket is coaxially affixed to the first shaft. The chain is in engagement with both sprockets and is in such a position and configured so as to rotate the second sprocket upon the first sprocket turning. Thus, when the drive shaft rotates in the first direction, the first sprocket is rotated in the first direction. This causes the second sprocket also to be rotated in the first direction, which consequently drives the first shaft in the first direction.

Thus it can be seen that the rotation of the drive shaft in one direction achieves, through the action of the hybrid transmission comprising the gear train and the sprocket train, a counter-rotation of the two coaxial driven shafts and thus imparts counter-rotation to propellers attached thereto. There is no known system that uses fewer components than that of the present invention, which permits lower weight, improved efficiency, and enhanced reliability.

Using the present hybrid gear/sprocket transmission permits driving an automobile engine at the point of maximum horsepower, which generally implies a motor crank rotational speed approximately in the range of 5000–5200 rpm, and then gearing down the rotational speed to roughly 1200–2800, possibly even lower, a quieter speed at which to run the propellers.

The invention is not, of course, limited to the use of an automobile engine; in fact, the presence of the gear and sprocket trains enables the user to optimize for efficiency and noise characteristics by altering gear ratios as desired. An aircraft engine may also be used.

Yet another feature of the present invention is an improved lubrication system, in which an oil pump is no longer necessary, owing to the presence of the two coaxial driven shafts, between which lubricant may pass and be moved by the counter-rotation thereof. This feature of the system comprises means for injecting a lubricant into a space between the driven shafts and means for blocking the entry hole during use to retain the lubricant therein.

Among the benefits of the present invention are a minimization of components, which is believed to increase reliability and dependability, and a decrease in the weight, which increases performance and fuel efficiency. Present counter-rotator transmissions known in the art have a weight of 140–200 lbs, whereas the hybrid transmission of the present invention has a weight in the range of 90–110 lbs.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
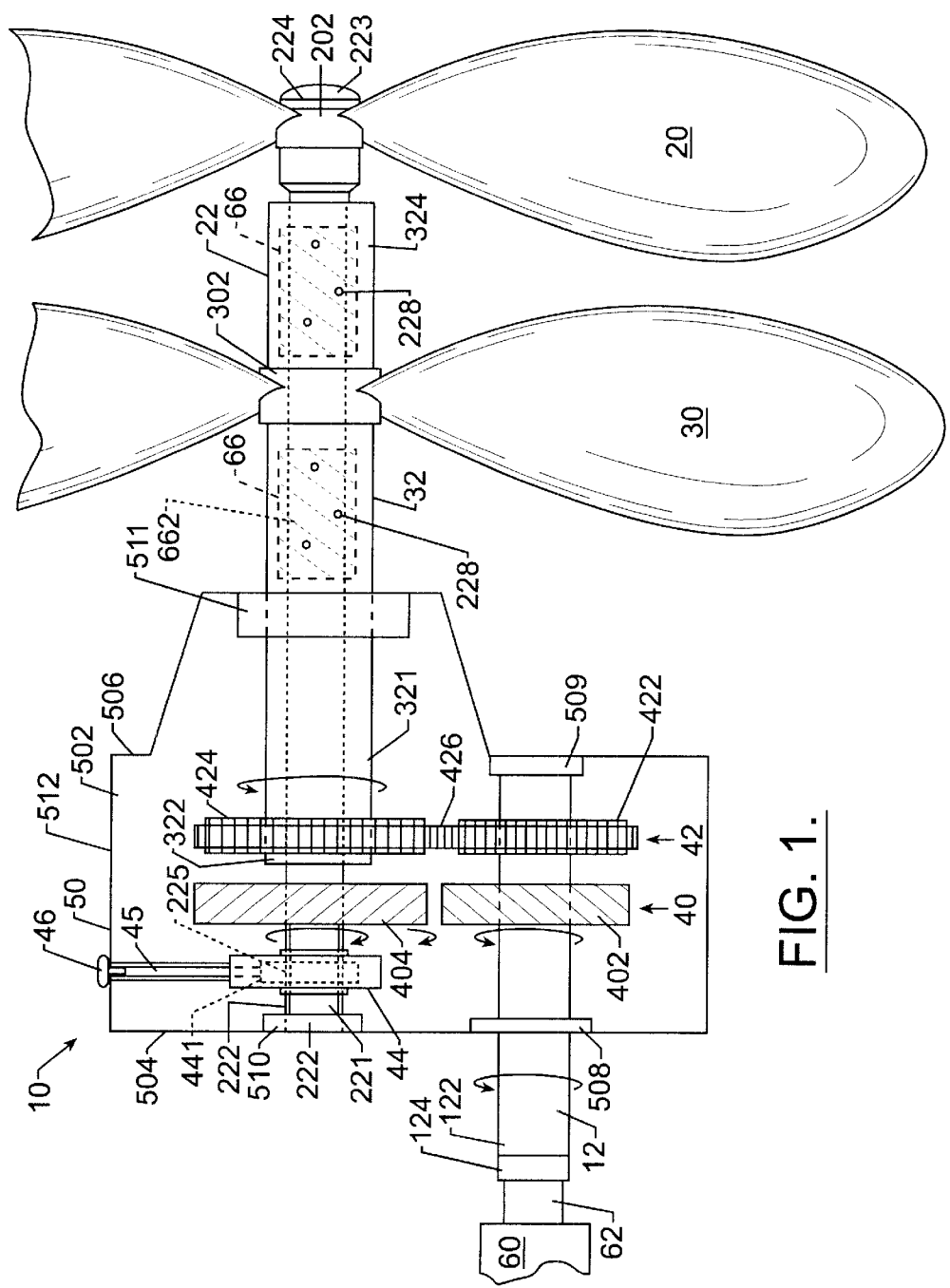
FIG. 1 is a side cross-sectional view of a first embodiment of a transmission for driving counter-rotating propellers, also showing the shaft lubrication system.
Figure 2:
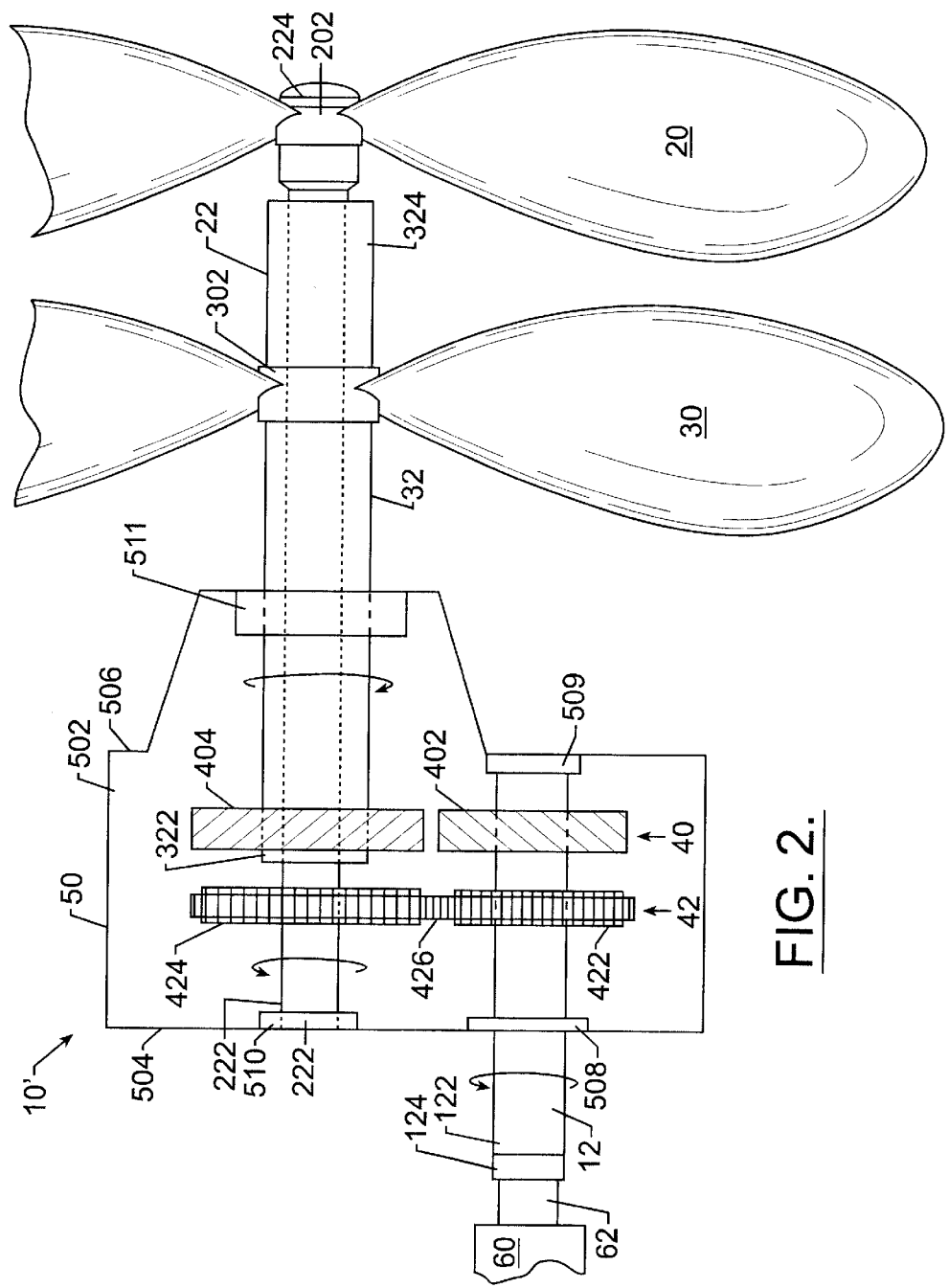
FIG. 2 is a side cross-sectional view of a second embodiment of a transmission for driving counter-rotating propellers.

A description of the preferred embodiments of the present invention will now be presented with reference to FIGS. 1 and 2.

The hybrid transmission 10 of the present invention, shown from the side in FIG. 1, which is designed to drive a pair of coaxial, counter-rotating propellers 20 and 30, comprises a case 50 that has an interior space 502, a fore side 504, and an aft side 506. It is preferred that the case exterior be aerodynamically shaped in order to confer good airflow characteristics to the transmission 10 during use at high speeds.

A drive shaft 12 extends into the interior space 502 of the case 50 through the case's fore side 504. The drive shaft 12 is rotatable in a first direction, shown here as counterclockwise when viewed from the front. Typically the drive shaft's fore portion 122, which extends outside the case 50, contains a coupler 124 for mating with a crank shaft 62 from an engine 60, which generates the rotational motion. The drive shaft 12 is preferably configured as a through shaft with respect to the case 50, and is thus supportable via brackets 508,509 affixed on the inside of both the fore 504 and the aft 506 sides, respectively, of the case's interior space 502. This dual support confers exceptional stability to the drive shaft 12.

The outer propeller 20 is mounted via propeller mount 202 adjacent the aft end 224 of, and is rotated by, a first driven shaft 22 that extends from the back side 506 into the interior space 502 of the case 50. The fore end 222 of the outer propeller 20 is supported via bracketing 510 on the inside of the case's fore side 504. Preferably the first driven shaft 22 comprises a hollow shaft, having a lumen 221 therethrough. A removable cap 223 at the aft end 224 leads to the lumen 221, as does a hole 225 adjacent the fore end 222.

The inner propeller 30 is mounted via propeller mount 302 to the aft portion 324 of, and is rotated by, a second hollow driven shaft 32 that extends from the aft side 506 into the interior space 502 of the case 50. The second hollow shaft 32 is positioned in surrounding, generally coaxial arrangement to the first hollow driven shaft 20 and is shorter than the first driven shaft 22. These relative lengths permit the fore end 222 and the aft portion 224 of the first driven shaft 22 to protrude, respectively, beyond the fore end 322 and the aft portion 324 of the second driven shaft 32. The second driven shaft 32 is supported on the interior of the case's aft side 506 by bracketing 511.

In a preferred embodiment the longitudinal axes of the drive shaft 12 and the first 22 and second 32 hollow driven shafts are positioned generally in vertical alignment. This positioning confers improved stability during use, as the gyroscopic forces balance optimally in this configuration.

The transmission 10 of the present invention further comprises two drive trains housed within the case 50, one for driving each of the hollow driven shafts 22,32. The first train 40 comprises a gear train comprising an even number of gears for changing the incoming rotational direction. The embodiment shown in FIG. 1 contains two gears: a drive gear 402 coaxially affixed to the drive shaft 12 and a driven gear 404 coaxially affixed to the first hollow shaft 22. The driven gear 404 is positioned and configured so as to be rotatable by the drive gear 402. Thus, when the drive shaft 12 rotates in the first direction, here shown as counterclockwise, the drive gear 402 is rotated in the same direction, and the driven gear 404 is rotated in a second direction opposite in sense to the first direction, that is, clockwise. Thus the first hollow shaft 22 is driven in a clockwise direction also, as would be an attached propeller 20.

The second drive train 42 comprises a sprocket train for maintaining the incoming rotational direction. The sprocket train 42 comprises a drive sprocket 422, a driven sprocket 424, and a chain 426. The drive sprocket 422 is coaxially affixed to the drive shaft 12, and the driven sprocket 424 is coaxially affixed to the second hollow shaft 32. The chain 426 is positioned in encompassing relation to the teeth of the sprockets 422,424 and is configured so as to rotate the driven sprocket 424 upon a rotation of the drive sprocket 422. Therefore, in use, when the drive shaft 12 rotates in the first direction, the drive sprocket 422 is rotated in the first direction, the driven sprocket 424 is also rotated in the first direction, and the second hollow shaft 32 is rotated in the first direction, conferring counter-rotational movement to the inner propeller 30 with respect to the outer propeller 20.

In an alternate embodiment 10' (FIG. 2), the gear train 40 and the sprocket train 50 are interchanged in axial position, with the gear train 40 driving the second hollow driven shaft 22 and the sprocket train 50 driving the first hollow driven shaft 32.

Particular benefits of the hybrid propulsion system of the present invention include the possibility of using an even number of gears, since a planetary, intermediate, sense-changing gear is no longer necessary to achieve counter-rotation. In addition to the weight and commensurate efficiency advantage conferred thereby, stability is also improved, with balancing force vectors conferring added reliability and durability. For example, failures are known to have been caused by outward-pointing forces imposed upon the planetary gear by the driving and driven gears. Further, all the gears in the present invention are mounted on through shafts, which are also stronger and more stable.

In either of the above-detailed embodiments it may be seen that the first and the second drive trains can be adapted to drive the propellers at different speeds, if desired which can provide improved thrust characteristics, increased fuel efficiency, and reduced noise.

Shaft Lubrication System

An additional aspect of the present invention comprises a lubrication system for delivering lubricant to elements of the propulsion system. A particular embodiment of the lubrication system, illustrated in FIG. 1, comprises means for injecting, sealing, and circulating a lubricant within an enclosed space including the hollow shafts 22,32 without the use of a mechanical pump. Upon removal of the cap 223, lubricant may be injected into the inner shaft's lumen 221. The rotational motion of the shaft 22 drives lubricant via "centrifugal force" from the inner shaft's lumen 221 out through a plurality of holes 228 in the aft portion of the shaft 22 to enter the space between the shafts 22,32, where there are positioned a plurality of floating cylindrical bearings 66, which maintain the distance between the shafts 22,32 and also assist to distribute lubricant. In a preferred embodiment there are between two and four of these bearings 66 positioned in spaced relation from each other between the shafts 22,32, and the material comprises brass. Although brass is disclosed herein, it will be understood by one of skill in the art that another material may be used, preferably a metal dissimilar from the material of which the shafts 22,32 are composed.

In order to provide a path for the escape of trapped air in the space to be lubricated, a toroidal collar 44 is provided that is positioned around the inner shaft 22 between the gear 404 and the bearing 510. To an upper end of the collar 44 is affixed a line 45 that leads at a top end from the case's 50 top side 512, and is sealable with a removable cap 46. The line 45 leads at a top end to a void 441 in the collar 44 that surrounds the inner shaft 22. Two 0-rings 47 are positioned in surrounding relation to the collar 44 around the inner shaft 22 to prevent lubricant from leaking out from the void 441 to the exterior of the inner shaft 22. Thus, in use, lubricant that has been injected into the inner shaft's lumen 221 also proceeds forward through the lumen 221 and reaches the collar's void 441. Any air bubbles that have been trapped along the way can then escape through the uncapped line 45, and then the cap 46 can be replaced. The collar 44 does not turn with the shaft 22, but rather floats thereon, being held substantially in place by the line 45.

The bearings 66 themselves represent a novel lubrication element, being designed to maximize lubricant return in the fore direction. In a preferred embodiment each bearing 66 has a series of generally helical grooves 662 cut in the outer surface, through which the lubricant may move to be distributed within the outer shaft 32.

This lubrication system eliminates the oil pump and associated gear previously known and used in the art, and thus also improves fuel efficiency by reducing weight by 15–20 lbs.

It may be appreciated by one skilled in the art that additional embodiments may be contemplated, including variable numbers and sizes of gears, which may be positioned and configured to permit variable relative speeds of the two counter-rotating propellers.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for making a transmission comprising the steps of:
    rotatably affixing a driven sprocket having teeth within a housing and to an inner shaft for rotating an outer propeller;
    rotatably affixing an aft driven gear within the housing and to a hollow outer shaft coaxial with the inner shaft for rotating an inner propeller, the aft driven gear coaxial with the driven sprocket;
    opposedly affixing a fore end and an aft end of a drive shaft for rotation within the housing;
    mounting a drive sprocket on the drive shaft in driving relation to the driven sprocket;
    mounting an aft drive gear on the drive shaft in driving relation to the aft driven gear;
    meshing a chain with the teeth of the driven sprocket and the drive sprocket; and
    providing means for driving the driven sprocket and the aft driven gear in counter-rotation.

2. A transmission for converting an engine drive shaft rotation into coaxial counter-rotations for driving a pair of propellers, the transmission comprising:
    a fore driven gear having teeth, the fore driven gear affixable to an inner shaft for rotating an outer propeller;
    a driven sprocket having teeth affixable to a hollow outer shaft coaxial with the inner shaft for rotating an inner propeller, the driven sprocket coaxial with the fore driven gear;
    a drive shaft having an aft end rotatably affixable within the housing and a fore end having means for being rotatably driven;
    a fore gear affixed for corotation with the drive shaft and having fore gear teeth positioned for meshing with the fore driven gear teeth for driving the fore driven gear in a first direction;
    a drive sprocket affixed for corotation with the drive shaft and having for driving the driven sprocket in a second direction opposite the first direction; and
    a chain meshable with the teeth of the driven sprocket and the drive sprocket.

3. The transmission recited in claim 2, further comprising intermediate gear shaft fore and aft bearing means for rotatably affixing a fore end and the aft end of the intermediate gear shaft to the housing, respectively.

4. The transmission recited in claim 2, further comprising inner shaft bearing means for rotatably affixing a fore end of the inner shaft to the housing.

5. The transmission recited in claim 2, wherein the drive shaft fore end is matable with a crank shaft of an engine.

6. The transmission recited in claim 2, further comprising outer shaft bearing means for rotatably affixing an aft end of the outer shaft to the housing.

7. The transmission recited in claim 2, wherein the drive shaft and the inner and the outer shafts are positionable within the housing in generally vertical alignment.

8. A method for improving an efficiency and lowering a noise output of a counter-rotating-propeller-driven vehicle comprising the steps of:
    providing a propulsion system comprising:
        an inner shaft having means for affixing an outer propeller thereto;
        a hollow outer shaft having a lumen therethrough and means for affixing an inner propeller thereto and positionable in surrounding and coaxial relation to the inner shaft;
        a fore driven gear having teeth, the fore driven gear affixable to the inner shaft;
        a driven sprocket having teeth affixable to the outer shaft, the driven sprocket coaxial with the fore driven gear;
        a drive shaft having an aft end rotatably affixable within the housing and a fore end having means for being rotatably driven;
        a fore gear affixed for corotation with the drive shaft and having fore gear teeth positioned for meshing with the fore driven gear teeth for driving the fore driven gear in a first direction;
        a drive sprocket affixed for corotation with the drive shaft and having teeth for driving the driven sprocket in a second direction opposite the first direction;
        a chain meshable with the teeth of the driven sprocket and the drive sprocket; and
    utilizing the propulsion system to drive a pair of propellers in counter-rotating motion.

9. A propulsion system for driving a pair of propellers in counter-rotation, the transmission comprising:
    an inner shaft having means for affixing an outer propeller thereto;
    a hollow outer shaft having a lumen therethrough and means for affixing an inner propeller thereto and positionable in surrounding and coaxial relation to the inner shaft;
    a fore driven gear having teeth, the fore driven gear affixable to the inner shaft;
    a driven sprocket having teeth affixable to the outer shaft, the driven sprocket coaxial with the fore driven gear;
    a drive shaft having an aft end rotatably affixable within the housing and a fore end having means for being rotatably driven;
    a fore gear affixed for corotation with the drive shaft and having fore gear teeth positioned for meshing with the fore driven gear teeth for driving the fore driven gear in a first direction; and
    a drive sprocket affixed for corotation with the drive shaft and having teeth for driving the driven sprocket in a second direction opposite the first direction; and
    a chain meshable with the teeth of the driven sprocket and the drive sprocket.

10. A transmission for converting an engine drive shaft rotation into coaxial counter-rotations for driving a pair of propellers, the transmission comprising:
    a housing having an interior space, a fore side, and an aft side opposed to the fore side, the fore side affixable to an engine bell housing, an opening in the aft side for permitting a pair of coaxial propeller shafts to pass therethrough, and an opening in the fore side;

a fore driven gear having teeth, the fore driven gear positioned within the housing interior space and affixable to an inner shaft for rotating an outer propeller;

a driven sprocket having teeth positioned within the housing interior space and affixable to a hollow outer shaft coaxial with the inner shaft for rotating an inner propeller, the driven sprocket coaxial with the fore driven gear;

a drive shaft having an aft end rotatably affixable within the housing and a fore end extending through the housing fore side opening and having means for being rotatably driven by an engine;

a fore gear affixed for corotation with the drive shaft and having fore gear teeth positioned for meshing with the fore driven gear teeth for driving the fore driven gear in a first direction;

a drive sprocket affixed for corotation with the drive shaft and having teeth for driving the driven sprocket in a second direction opposite the first direction; and a chain meshable with the teeth of the driven sprocket and the drive sprocket.

11. The transmission recited in claim 10, further comprising bearing means for rotatably affixing:

the inner shaft to the housing fore side;

the outer shaft to the housing aft side; and the drive shaft to the housing fore side and aft side.

12. A propulsion and lubrication system comprising:

a hollow inner shaft for rotating an outer propeller having an opening at an end thereof and a lumen therethrough in communication with the hole;

a hollow outer shaft coaxial with the inner shaft for rotating an inner propeller positioned in surrounding and coaxial relation to the inner shaft;

removable means for sealing the opening in the inner shaft;

means for driving the inner and outer shaft in counter-rotating relation; and bearing means positionable between the inner and the outer shafts in covering relation to the hole, the bearing means movable relative to the inner shaft;

wherein lubricant is sealable within the inner shaft and is distributable through the hole, between the inner shaft and the bearing means, into a space between the inner and the outer shaft, without a pump for circulating the lubricant.

13. The propulsion and lubrication system recited in claim 12, wherein the bearing means comprise a helical groove in an outer surface thereof.

14. The propulsion and lubrication system recited in claim 12, wherein the inner and the outer shaft comprise a first material and the bearing means comprises a second material distinct from the first material.

15. The propulsion and lubrication system recited in claim 14, wherein the second material comprises brass.

16. The propulsion and lubrication system recited in claim 12, wherein the bearing means comprises a substantially cylindrical element slidable over the inner shaft.

17. The propulsion and lubrication system recited in claim 16, wherein the hole comprises a plurality of sets of holes and the cylindrical element comprises a plurality of cylinders positioned in axially spaced relation along the inner shaft, each of the plurality of cylinders in covering relation to a one of the plurality of sets of holes.

18. A method for making a transmission comprising the steps of:

rotatably affixing a fore driven gear having teeth within a housing and to an inner shaft for rotating an outer propeller;

rotatably affixing a driven sprocket having teeth within the housing and to a hollow outer shaft coaxial with the inner shaft for rotating an inner propeller, the driven sprocket coaxial with the fore driven gear;

opposedly affixing a fore end and an aft end of a drive shaft for rotation within the housing;

mounting a fore drive gear on the drive shaft in driving relation to the fore driven gear;

mounting a drive sprocket on the drive shaft in driving relation to the driven sprocket;

meshing a chain with the teeth of the driven sprocket and the drive sprocket; and providing means for driving the fore driven gear and the driven sprocket in counter-rotation.

19. A transmission for converting an engine drive shaft rotation into coaxial counter-rotations for driving a pair of propellers, the transmission comprising:

a driven sprocket having teeth affixable to an inner shaft for rotating an outer propeller;

an aft driven gear having teeth, the aft driven gear affixable to a hollow outer shaft coaxial with the inner shaft for rotating an inner propeller, the aft driven gear coaxial with the driven sprocket;

a drive shaft having an aft end rotatably affixable within the housing and a fore end having means for being rotatably driven;

a drive sprocket affixed for corotation with the drive shaft and having teeth for driving the driven sprocket in a first direction;

an aft drive gear affixed for corotation with the drive shaft and having aft gear teeth positioned for meshing with the aft driven gear teeth, the aft gear teeth for driving the aft driven gear in a second direction opposite the first direction; and a chain meshable with the teeth of the driven sprocket and the drive sprocket.

20. A propulsion system for driving a pair of propellers in counter-rotation, the transmission comprising:

an inner shaft having means for affixing an outer propeller thereto;

a hollow outer shaft having a lumen therethrough and means for affixing an inner propeller thereto and positionable in surrounding and coaxial relation to the inner shaft;

a driven sprocket having teeth affixable to the inner shaft;

an aft driven gear having teeth, the aft driven gear affixable to the outer shaft, the aft driven gear coaxial with the driven sprocket;

a drive shaft having an aft end rotatably affixable within the housing and a fore end having means for being rotatably driven;

a drive sprocket affixed for corotation with the drive shaft and having teeth for driving the driven sprocket in a first direction; and an aft gear affixed for corotation with the drive shaft and having aft gear teeth positioned for meshing with the aft driven gear teeth for driving the aft driven gear in a second direction opposite the first direction; and a chain meshable with the teeth of the driven sprocket and the drive sprocket.

21. A transmission for converting an engine drive shaft rotation into coaxial counter-rotations for driving a pair of propellers, the transmission comprising:

- a housing having an interior space, a fore side, and an aft side opposed to the fore side, the fore side affixable to an engine bell housing, an opening in the aft side for permitting a pair of coaxial propeller shafts to pass therethrough, and an opening in the fore side;
- a driven sprocket having teeth positioned within the housing interior space and affixable to an inner shaft for rotating an outer propeller;
- an aft driven gear having teeth, the aft driven gear positioned within the housing interior space and affixable to a hollow outer shaft coaxial with the inner shaft for rotating an inner propeller, the aft driven gear coaxial with the driven sprocket;
- a drive shaft having an aft end rotatably affixable within the housing and a fore end extending through the housing fore side opening and having means for being rotatably driven by an engine;
- a drive sprocket affixed for corotation with the drive shaft and having teeth for driving the driven sprocket in a first direction;
- an aft drive gear affixed for corotation with the drive shaft and having aft gear teeth positioned for meshing with the aft driven gear teeth for driving the aft driven gear in a second direction opposite the first direction; and
- a chain meshable with the teeth of the driven sprocket and the drive sprocket.

22. A method for improving an efficiency and lowering a noise output of a counter-rotating-propeller-driven vehicle comprising the steps of:

providing a propulsion system comprising:
- an inner shaft having means for affixing an outer propeller thereto;
- a hollow outer shaft having a lumen therethrough and means for affixing an inner propeller thereto and positionable in surrounding and coaxial relation to the inner shaft;
- a driven sprocket having teeth affixable to the inner shaft;
- an aft driven gear having teeth, the aft driven gear affixable to the outer shaft, the aft driven gear coaxial with the driven sprocket;
- a drive shaft having an aft end rotatably affixable within the housing and a fore end having means for being rotatably driven;
- a drive sprocket affixed for corotation with the drive shaft and having teeth for driving the driven sprocket in a first direction;
- an aft gear affixed for corotation with the drive shaft and having aft gear teeth positioned for meshing with the aft driven gear teeth for driving the aft driven gear in a second direction opposite the first direction; and
- a chain meshable with the teeth of the driven sprocket and the drive sprocket; and utilizing the propulsion system to drive a pair of propellers in counter-rotating motion.

* * * * *